(No Model.)

E. P. TUCKER.
AUTOMATIC STOCK FEEDER.

No. 538,755. Patented May 7, 1895.

Witnesses:
J. F. Coleman
M. C. Massie

Inventor
Edward P. Tucker
by D. C. Fitzgerald
Atty.

United States Patent Office.

EDWARD P. TUCKER, OF NEW YORK, N. Y., ASSIGNOR TO LAURA A. TUCKER, OF SAME PLACE.

AUTOMATIC STOCK-FEEDER.

SPECIFICATION forming part of Letters Patent No. 538,755, dated May 7, 1895.

Application filed August 23, 1894. Serial No. 521,067. (No model.)

*To all whom it may concern:*

Be it known that I, EDWARD P. TUCKER, a citizen of the United States, residing at New York, in the county of New York, State of New York, have invented certain new and useful Improvements in Automatic Stock-Feeders; and I do hereby declare the following to be a full, clear, and exact description of the invention, such as will enable others skilled in the art to which it appertains to make and use the same.

My invention relates to improvements in automatic stock-feeders.

The invention will first be described in connection with the accompanying drawings, and then particularly pointed out in the claim.

Figure 1:
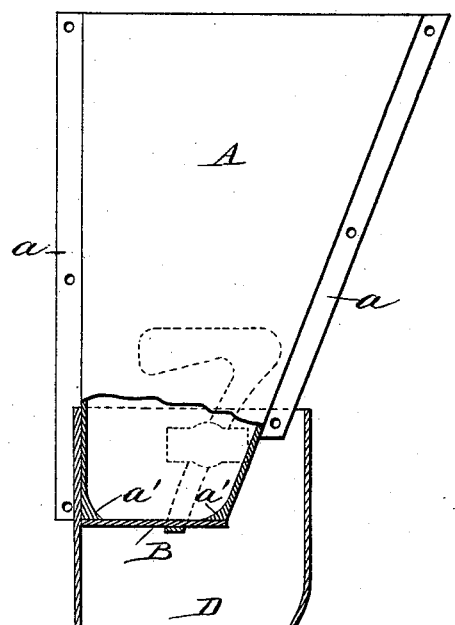
Figure 2:
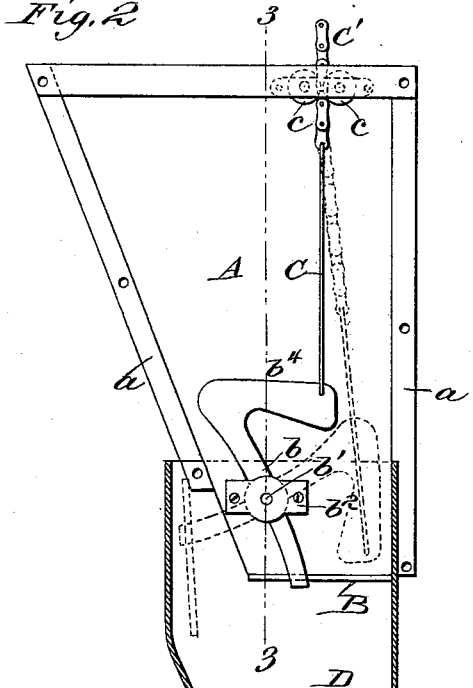
Figure 3:
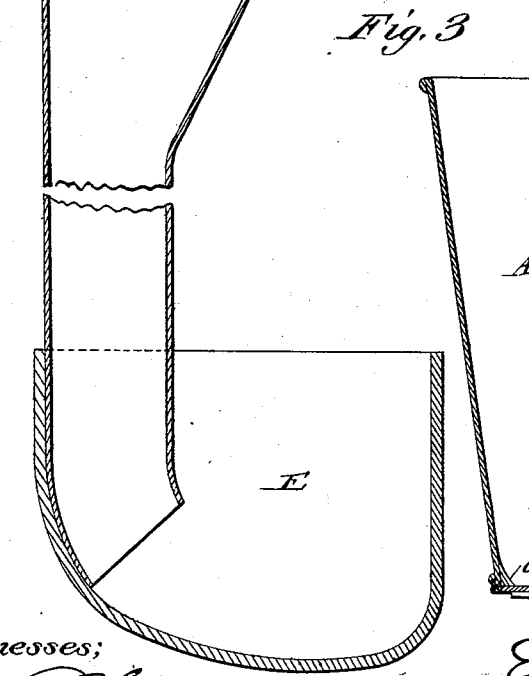
Figure 4:
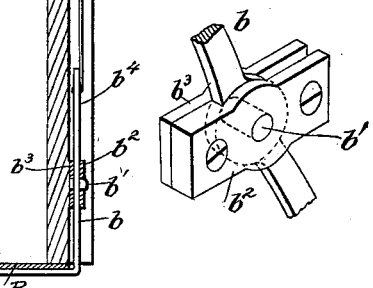

In the drawings, Figure 1 is a front elevation, partly in section, of a device embodying my invention. Fig. 2 is a rear elevation, partly in section, of the same. Fig. 3 is a sectional view on line 3 3, Fig. 2. Fig. 4 is a detail view of the pivot-block.

Referring to the drawings, A is a supply hopper provided with flanges $a$ by which it may be screwed or otherwise secured to the wall.

The lower end of the hopper is closed by a swinging trap door B attached to the lower end of a lever $b$, fulcrumed at $b'$, between two plates, $b^2$, $b^3$, as shown in Fig. 4, which together form a pivot block and prevent any lateral play of the lever $b$. The upper end $b^4$ of the lever is bent at an angle to the part, $b$, and is weighted in order to cause the lever to swing and open the door or gate B, the open position of these parts being indicated in dotted lines in Fig. 2. Moreover, the weighted end $b^4$ is so arranged that the center of gravity of the entire lever and weight with the door is slightly to the left of the line 3—3 through the fulcrum, whereby the tendency of the weight is to close the door and hold it closed after said center of gravity has passed the said line 3—3; but when the hopper is filled with grain or other feed, the center of gravity of the moving mechanism above referred to, is shifted so that the weight tends to open the trap door.

To the weighted end is attached one end of a chain or rope C, which is attached at its other end to a chain C' passing between two pulleys $c$, mounted at the top of the hopper, the chain C' being led off to any convenient point where it is removably secured.

The lower end of the hopper A enters a spout D, which conveys the feed to the trough E, as will be plain from the drawings.

The spout D is of sufficient diameter to hold part of the feed, and is cut off at an angle at its lower end and curved as shown, whereby the feed is not emptied in the trough all at once, but is partly retained in the spout until the animal removes that in the trough, whereupon that in the spout gradually slides down. In this way the feed is not wasted by being pushed out of the trough, nor is the animal apt to eat too fast.

One of the essential features of my invention consists in flanging the lower end of the supply hopper A inward, as shown at $a'$, the flanged edge being preferably rounded at its upper side in order to prevent the feed from sticking to it. By thus flanging the said lower edge inward, a broader bearing is formed for the trap door to close against, and furthermore, the feed is deflected toward the center of the trap door when closed and is prevented from leaking out sidewise between the bottom edge of the hopper and the trap door.

In using my device the hopper A is filled with the necessary amount of feed to constitute one meal, and at a certain time the chain C' is released, whereby the weight of the feed on the bottom of the trap door, causes the same to pull down on the chain and swing away from the end of the hopper, thus allowing the feed to run into the trough. By now pulling up on the chain the door is swung back to its closed position, the weighted end closing the door rapidly and securely. The chain C' being now secured again, the hopper may be refilled.

The advantages of first putting feed into the hopper and then dropping it into the trough are more apparent when a number of such automatic feeding devices are employed, all operated by one chain C', thus discharging the feed simultaneously from all, the hoppers preferably being filled from the floor above. In the usual way of feeding one animal at a time, it requires considerable time to feed any great number of horses. Hence those last fed are apt to either not have sufficient time to digest their food, or to become impatient and restless, which disadvantages my apparatus overcomes. By these feeding devices connected to one chain, the hoppers may all be filled in the evening and the feed dropped in all the troughs, by releasing the chain, which can be done in any suitable way, as by a clock or electro mechanism operated from a distance.

Having thus fully described my invention, what I claim, and desire to secure by Letters Patent, is—

In a feeding device, the combination, with a supply hopper having flanged portions $a$ and an inward flanged lower edge rounded on its upper face, of a trap door arranged to contact with the lower face of the flanged lower edge, a lever having one end bent at an angle and weighted, said lever being attached to the trap door, a pair of fulcrum blocks attached to the hopper, between which blocks the lever is fulcrumed, a chain connected to the weighted end of the lever, and a pair of pulleys secured to the upper back portion of the hopper, between which pulleys the chain passes, substantially as described.

In testimony whereof I affix my signature in presence of two witnesses.

EDWARD P. TUCKER.

Witnesses:
    LEWIS M. SEGEE,
    JAMES H. THOMPSON.